(12) United States Patent
Strandberg et al.

(10) Patent No.: US 7,506,730 B2
(45) Date of Patent: Mar. 24, 2009

(54) SET OF BRAKES AND A VEHICLE WITH THE SET OF WET BRAKES

(75) Inventors: Jonny Strandberg, Eskilstuna (SE); Bengt Vilen, Sala (SE); Dong Woo Kim, Changwon (KP)

(73) Assignee: Volvo Construction Equipment Components AB, Eskilstuna (SE)

( * ) Notice: Subject to any disclaimer, the term of this patent is extended or adjusted under 35 U.S.C. 154(b) by 577 days.

(21) Appl. No.: 10/248,355

(22) Filed: Jan. 13, 2003

(65) Prior Publication Data

US 2003/0079947 A1 May 1, 2003

Related U.S. Application Data

(63) Continuation of application No. PCT/SE01/01515, filed on Jun. 29, 2001.

(30) Foreign Application Priority Data

Jul. 12, 2000 (SE) .................................... 0002637

(51) Int. Cl.
*B60T 1/06* (2006.01)
(52) U.S. Cl. ................. 188/18 A; 188/71.5; 188/264 D; 188/264 E
(58) Field of Classification Search ................ 188/71.5, 188/72.3, 18 A, 218 XL, 72.4, 71.6, 264 R, 188/264 D; 192/85 AA, 49
See application file for complete search history.

(56) References Cited

U.S. PATENT DOCUMENTS

| | | | | |
|---|---|---|---|---|
| 4,064,974 A | * | 12/1977 | Filderman | 188/71.3 |
| 4,491,202 A | * | 1/1985 | Schmitt | 188/71.5 |
| 4,529,067 A | * | 7/1985 | Scott | 188/18 A |
| 4,890,699 A | * | 1/1990 | Megginson et al. | 188/18 A |
| 5,174,420 A | * | 12/1992 | DeWald et al. | 188/264 E |
| 5,944,147 A | * | 8/1999 | Berwanger | 188/71.5 |
| 6,056,089 A | * | 5/2000 | Karlsson et al. | 188/71.6 |
| 6,076,639 A | * | 6/2000 | Dahlen et al. | 188/1.11 R |
| 6,115,662 A | * | 9/2000 | Sugano et al. | 701/76 |
| 6,116,383 A | * | 9/2000 | Bissonnette et al. | 188/71.5 |
| 6,532,637 B1 | * | 3/2003 | Niespodziany et al. | 29/401.1 |
| 6,581,730 B1 | * | 6/2003 | Haydon et al. | 188/71.5 |

FOREIGN PATENT DOCUMENTS

EP 1058024 A3 12/2000

OTHER PUBLICATIONS

International Search Report dated Oct. 22, 2001 from International Application PCT/SE01/01515.

* cited by examiner

*Primary Examiner*—Robert A Siconolfi
*Assistant Examiner*—Mariano Sy
(74) *Attorney, Agent, or Firm*—Novak Druce + Quigg LLP

(57) ABSTRACT

Braking arrangement, and vehicles upon which the braking arrangement can be incorporated. The braking arrangement including a set of at least two wet brakes (1), the brakes being adapted to produce different maximum braking force values. Each of the brakes includes a housing (4) with two housing parts (13, 14) which can be separated from one another. A disk set is enclosed in each housing and a brake piston (17) for actuating the disk set is provided for the purpose of producing a braking effect on a rotating member connected to the disk set. The disk set of a first (1) of the brakes includes a first number of disks (7, 10) which are active for braking, and the disk set of a second of the brakes, which brake is intended for a smaller maximum braking force in relation to the first brake, includes, in relation to the first number, a smaller number of disks which are active for braking of the same size as the disks in the first brake. All of the disks (7) in each of the disk sets are arranged so as to interact with at least one adjacent disk (10) in order to produce the braking effect. A first (14) of the housing parts is identical in the two brakes, and a second (13) of the housing parts is of different design in the two brakes.

35 Claims, 2 Drawing Sheets

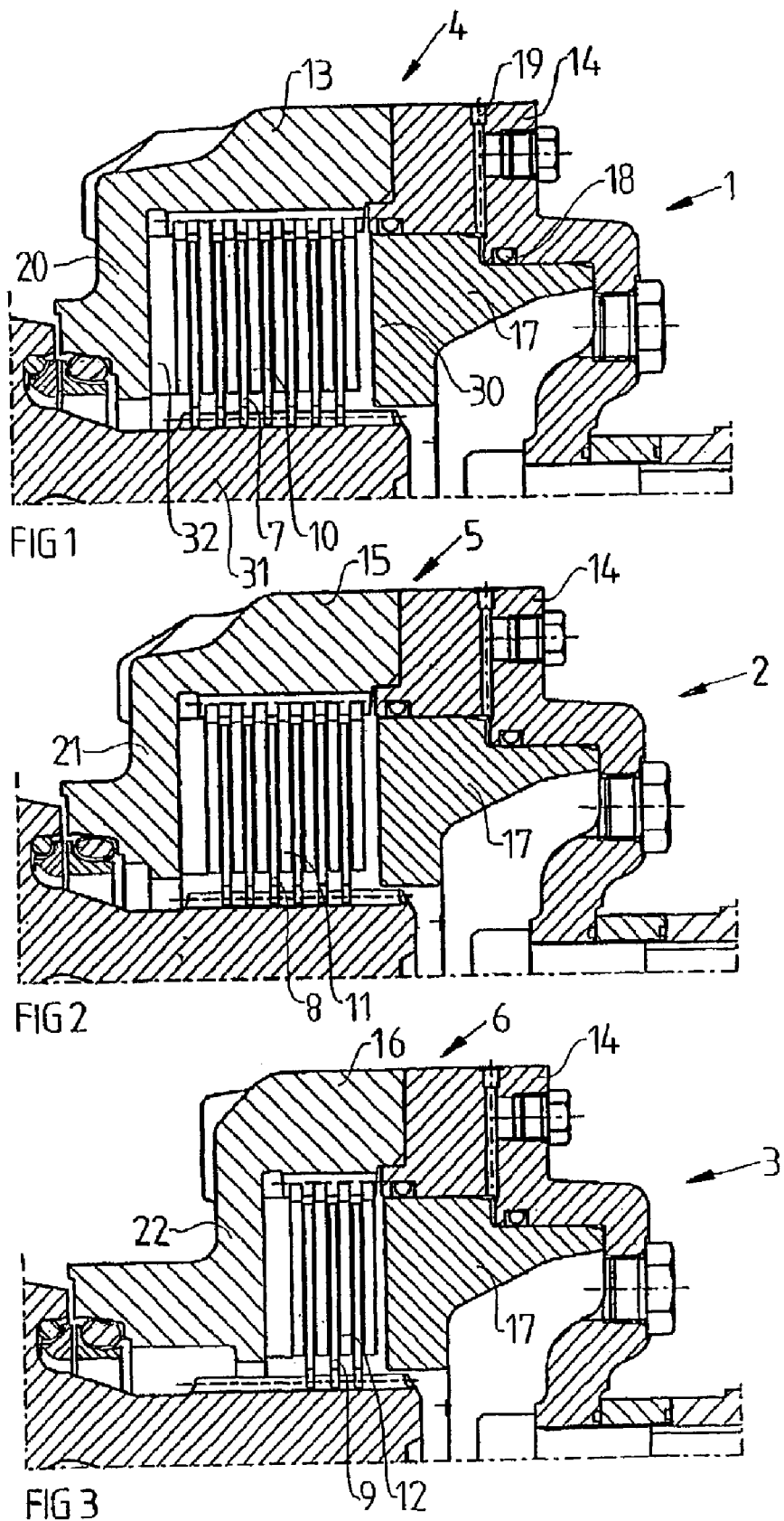

it is known. A secondary objective is to produce the wet brakes with reduced weight over known configurations.

These objectives are achieved by virtue of the fact that all of the disks in each of the disk sets are arranged so as to interact with at least one adjacent disk in order to produce the braking effect. Further, a first of the housing parts is identical in the two brakes, and a second of the housing parts is of a different design in the two brakes. Typically, the housing parts will be produced by casting, followed by machining. The first housing part, which is of the same kind for the two different brakes, is intended to include at least the majority of, and preferably all of the arrangements and connections which are required for the brake, such as the brake piston connection, connection ports for operating oil and cooling oil, and an arrangement for indicating wear of the disks, just as examples. The design of the first housing part is therefore more complex than that of the second housing part. Owing to the fact that the first housing part is identical for the two brakes, the housings can be manufactured in a cost-effective manner with minimum material consumption. Owing to the fact that the entire inner space of the brake, that is, that in which the disk set is arranged, can be used for disks which are active for braking, opportunities are afforded for a more space-effective brake, as far as the brake with smaller maximum braking effect is concerned.

According to a preferred embodiment of the invention, the different design of the second housing part of the two brakes includes the fact that one side wall of the second housing part, which faces a flat side of an outer disk in the disk set, is arranged at a shorter distance from the first housing part in the second brake than in the first brake. This is an advantageous embodiment of the housing, and it affords opportunities for a space-effective housing.

According to another preferred embodiment of the invention, the two housing parts of the first brake have the same extent or length in a direction at right angles to the plane of extension of the disks as the two the housing parts of the second brake. Owing to the fact that the brakes with different maximum braking effect values have the same longitudinal extent, parts located around the brake can be arranged in the same manner for the different brakes.

Another object of the invention is to produce a vehicle having a front axle and at least one rear axle, on which axles the wheels of the vehicle are arranged. The design of the present invention affords opportunities for more cost-effective production of the vehicle than previously known. This is made possible by virtue of the fact that all the disks in each of the disk sets are arranged so as to interact with at least one adjacent disk in order to produce the braking effect, that a first of the housing parts is identical in the two brakes, and that a second of the housing parts is of different design in the two brakes.

Other advantageous embodiments and advantages of the invention emerge from the other patent claims and the detailed description of exemplary embodiment(s) found hereinbelow.

SET OF BRAKES AND A VEHICLE WITH THE SET OF WET BRAKES

CROSS REFERENCE TO RELATED APPLICATIONS

This application is a continuation patent application of International Application No. PCT/SE01/01515, filed 29 Jun. 2001 which was published in English pursuant to Article 21(2) of the Patent Cooperation Treaty, and which claims priority to Swedish Application No. 0002637-7, filed 12 Jul. 2000. Both applications are expressly incorporated herein by reference in their entireties.

BACKGROUND OF INVENTION

1. Field of the Invention

The present invention relates to a set of at least two wet brakes that are adapted to produce different maximum braking force values. Each of the brakes includes a housing with two housing parts that can be separated from one another. A disk set is enclosed by the housing, and means is provided for actuating the disk set for the purpose of producing a braking effect on a rotating member connected to the disk set. The disk set of a first of the brakes has a first number of disks that are active for braking. The disk set of a second of the brakes, which brake is intended for a smaller maximum braking force in relation to the first brake, includes, in relation to the first number, a smaller number of disks or, respectively, which are active for braking of the same size as the disks in the first brake. The rotating member suitably consists of a hub for a wheel of a vehicle. The actuating means preferably consists of a hydraulic piston. The invention also relates to a vehicle having a front axle and at least one rear axle and upon which the wheels of the vehicle are arranged. A wet brake for each of the respective wheels is arranged so as to produce different maximum braking force values on the axles. The invention will be described below as implemented in a vehicle in the form of an articulated or frame-steered vehicle, what is commonly referred to as a dumper. This is a preferred, but in no way limiting application of the invention.

2. Background Art

It is known to manufacture two brakes intended for different maximum braking effect values with different dimensions of the disks in the disk sets of the brakes. That is to say, the disks of one of the brakes are of a first size and the disks of the other brake are of a second size. In this connection, the housings that enclose the two disk sets are also of different sizes.

For the purpose of bringing about more cost-effective manufacture of brakes for different maximum braking values, brakes have also been developed with similar parts. Therefore, a similar housing can be used for the brakes, as well as utilizing the same dimensions for the disks and the same number of disks in the disk sets of the different brakes. In these instances, the different braking effect is achieved by virtue of the disk sets having a different number of disks which are active for braking. In the brake with smaller maximum braking effect, the disk set is filled up with a number of filler disks; that is to say, disks that are not adapted for contributing to the braking effect. Since these filler disks are intended only for filling up the disk set, use is made of an inexpensive material, for example plastic material, so that these filler disks can be cost-effectively produced.

SUMMARY OF INVENTION

A primary objective of the presently disclosed invention is to produce a set of at least two wet brakes with different maximum braking effect values, and which afford opportunities for more cost-effective manufacture than has been tra-

BRIEF DESCRIPTION OF DRAWINGS

The invention is described in greater detail below, with reference to the embodiment shown in the accompanying drawings:

FIGS. 1-3 illustrate, in diagrammatic cross-sectional views, three different sets of wet brakes with seven, six and three brake disks, respectively, according to a preferred embodiment of the invention.

DETAILED DESCRIPTION

Figure 4:
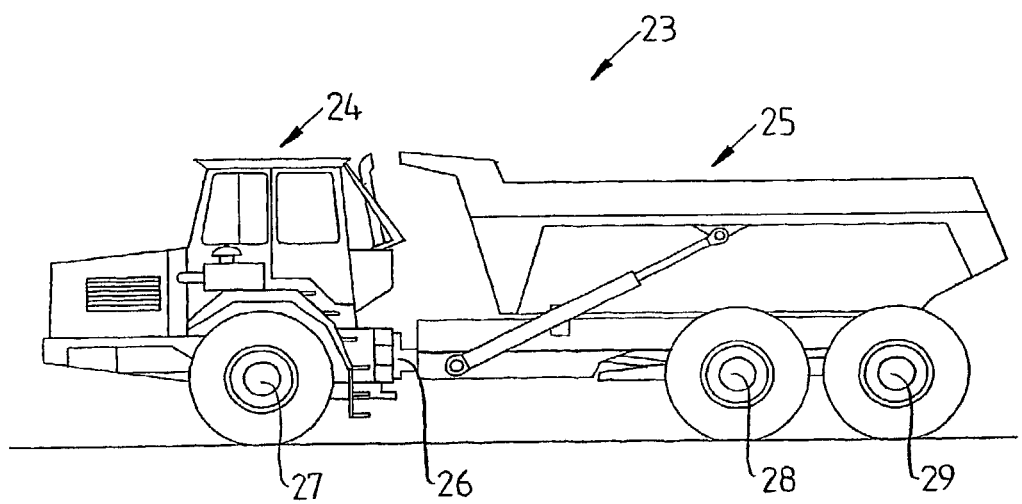
FIG. 4 is a side elevational view of an articulated dumper with three wheel axles, each of which is provided with the brakes according to FIGS. 1-3.

FIGS. 1-3 illustrate a set of three wet brakes 1, 2, 3. Each of the brakes 1, 2, 3 includes a housing 4, 5, 6 which each encloses a brake disk set with seven, six and, respectively, three disks 7, 8, 9. Here, brake disks 7, 8, 9 mean the disks which are connected firmly to an axle 31 of a vehicle wheel. All the brake disks 7, 8, 9 of the respective brake 1, 2, 3 are arranged to interact with two adjacent stator disks 10, 11, 12. Each of the brake disks 7, 8, 9 has an annular friction lining on the side of the disk which is intended to be brought into contact with the respective stator disk 10, 11, 12. The brake disks 7, 8, 9 have the same dimensions and are of the same type. The three brakes thus have different maximum braking effect values.

FIGS. 1-3 illustrate a set of three wet brakes 1, 2, 3. Each of the brakes 1, 2, 3 includes a housing 4, 5, 6 which each encloses a brake disk set with seven, six and, respectively, three disks 7, 8, 9. Here, brake disks 7, 8, 9 mean the disks which are connected firmly to and circumscribe an axle 31 of a vehicle wheel. All the brake disks 7, 8, 9 of the respective brake 1, 2, 3 are arranged to interact with two adjacent stator disks 10, 11, 12. Each of the brake disks 7, 8, 9 has an annular friction lining on the side of the disk which is intended to be brought into contact with the respective stator disk 10, 11, 12. The brake disks 7, 8, 9 have the same dimensions and are of the same type. The three brakes thus have different maximum braking effect values.

The brake 1, 2, 3 includes a means 17, in the form of a brake piston, intended for actuating the disk set. The brake piston 17 is made in one piece with a pressure plate 30 for actuating a disk in the disk set where that disk is arranged adjacent to the brake piston. The disk set is compressed between the brake piston and a counterpressure plate 32 in the housing when the brake piston is activated. Together with the housing 4, 5, 6, the brake piston 17 defines a space intended for the supply of pressure oil through an opening 19 in the housing. The brake has a number of sealing rings 18 on the contact surface between the brake piston 17 and the housing 4, 5, 6.

The housing 4, 5, 6 consists of two housing parts 13-16 which can be separated from one another. A first 14 of the housing parts is identical for the three brakes 1, 2, 3. This first housing part 14 is intended to be of more complex design in relation to the second housing part 13, 15, 16. The first housing part 14 is designed to hold the brake piston 17, and has seals 18 and a connection 19 for the supply of pressure oil to the piston 17. The actuating means 17 is of the same kind for the several brakes. The first housing part 14 can also include other connections and arrangements, such as an arrangement for brake slack adjustment and arrangement for returning the piston to the unactuated position after braking has been performed. An example of such a return arrangement includes a return spring which can be of various style. As used in the context of the present application, "identical" shall be taken to mean that the first housing part 14 has at least substantially the same shape, and preferably also substantially the same internal construction. That is to say, the same material and structure for the brakes 1, 2, 3.

The design of the second housing part 13, 15, 16 differs for the three brakes. One side wall 20, 21, 22 of the second housing part 13, 15, 16 (that wall being arranged on the opposite side of the disks to the brake piston 17) is arranged at a different distance from the first housing part 14 depending on the different number of disks in the brakes. In this connection, for example, the side wall 21 of the second brake 2 will be arranged at a shorter distance from the first housing part 14 than the side wall 20 of the first brake 1. The side walls 20, 21 and 22 have essentially the same thickness. The housings 4, 5, 6 of the three brakes 1, 2, 3 also have the same extent in a direction at right angles to the plane of extension of the disks 10, 11, 12; that is, a horizontal longitudinal direction as illustrated in FIGS. 1-3. This means that the brakes 1, 2, 3 have the same mounting dimensions, which in turn means that parts located around the respective brakes can be the same for the three brakes 1, 2, 3.

On account of its more complex construction, the first housing part 14 is more complicated to manufacture than the second housing part 13, 15, 16. The housing parts 13, 14, 15, 16 are exemplarily, but advantageously, manufactured by casting with subsequent machining. By keeping the design of the first housing part 14 constant in the three brakes 1, 2, 3 and varying the design of the second housing part 13, 15, 16 (which can be produced more easily in manufacturing terms), a cost-effective production method is achieved. On the one hand, a reduction in the number of items is achieved, and on the other hand, a reduction in weight of the housing assembly is also achieved.

As may be appreciated from FIGS. 1-3, one embodiment of the present invention may be characterized as set of wet brakes in which the set includes a plurality of brakes 1, 2, 3, each of which includes a disk set enclosed within a two-part housing.

In the case of FIGS. 1-3, the plurality of brakes includes three brakes, one each from FIGS. 1-3, that establish the brake set. A two-brake embodiment, however, is described immediately hereinbelow.

A first 1 of the plurality of brakes includes a first number of disks 7 configured to be capable of producing a first maximum braking force and a second 2 of the plurality of brakes includes a second number of disks 8 configured to be capable of producing a second maximum braking force. The first and second maximum braking forces are different from one another. The two-part housing 4 of the first brake 1 has one part 14 that is substantially identical to one part 14 of the two-part housing 5 of the second brake 2. Furthermore, the two-part housing 4 of the first brake 1 has a second part 13 that is different from a second part 15 of the two-part housing 5 of the second brake 2.

Each of the several brakes has a substantially identical longitudinal length to the other of the brakes. In the illustrated embodiment, this is accomplished, at least in part, by the fact that the second part 13 of the two-part housing 4 of the first brake 1 has a substantially identical longitudinal length compared to the second part 15 of the two-part housing 5 of the second brake 2. The longitudinal length of each brake should be taken along a substantially horizontally line as depicted in FIGS. 1-3.

The second part 13 of the two-part housing 4 of the first brake 1 is sized differently from the second part 15 of the two-part housing 5 of the second brake 2 thereby establishing an interior volume in the first brake different from an interior volume in the second brake. Further, the second part 13 of the two-part housing 4 of the first brake 1 has an extension portion sized differently from an extension portion of the second part 15 of the two-part housing 5 of the second brake 2 thereby establishing the substantially identical longitudinal lengths of the first 1 and second brakes 2. Still further, each of the first parts 14 of the first 1 and second brakes 2 have a longitudinally reciprocating piston 17 that actuates braking action in respectively associated disks. The extension portion of the second part 13 of the two-part housing 4 of the first brake 1 is positioned substantially opposite to the longitudinally reciprocating piston 17 of the first brake. The extension portion of the second part 15 of the two-part housing 5 of the second brake 2 is positioned substantially opposite to the longitudinally reciprocating piston 17 of the second brake 2.

FIG. 4 illustrates a side elevational view of an articulated or frame-steered vehicle 23. In the illustrated embodiment, the vehicle 23 takes the form of what is referred to as a dumper.

The dumper 23 includes a front vehicle part 24 bearing the drive engine and a rear, load-bearing vehicle part 25 that, via a vertically oriented pivot pin 26, is connected to the front vehicle part 24. The front and rear vehicle parts 24 and 25 are also interconnected in an articulated manner around a horizontally oriented pivot pin so that the vehicle parts can be rotated in relation to one another about a longitudinal axis of the vehicle.

The dumper 23 has three wheel axles, namely a front axle 27 and two rear axles 28, 29. According to a first model of the articulated dumper 23, the front wheel axel 27 is provided with the first 1 of the brakes with seven brake disks 7 (FIG. 1), a first rear wheel axle 28 is provided with a second 2 of the brakes with six brake disks 8 (FIG. 2), and the second rear wheel axle 29 is provided with a third 3 of the brakes with three brake disks 9 (FIG. 3). By virtue of the configuration of the present invention, it is possible to produce the articulated dumper 23 with brakes 1, 2, 3 having different maximum braking effect values on the three wheel axles 27-29 using a fewer individual components than has been previously known, and thereby also causing less weight to be imposed on the vehicle because of the braking arrangement.

The invention is not to be considered as being limited to the illustrative embodiments described above, but a number of further variants and modifications are possible within the scope of the patent claims found hereinbelow. It is pointed out in particular that the person skilled in the art will be capable of effecting alterations to the invention without leaving the scope of the patent protection. The number of brake disks selected in the embodiment described above is of course to be regarded as only exemplary, and can be varied within the scope of the patent claims.

The invention claimed is:

1. A set of wet brakes comprising:
    at least two wet brakes configured to be distributed among a plurality of vehicle wheels to produce different maximum braking force values at those different wheels;
    each wet brake comprising a housing having two housing parts separable from one another, said two housing parts comprising an actuator housing and a disk housing;
    a disk set enclosed by each disk housing and an actuator located in each actuator housing, said actuator configured to actuate an associated disk set for the purpose of producing a braking effect on an associated vehicle wheel;
    a first disk set of a first of the at least two wet brakes comprising a first number of disks which are active for braking, and a second disk set of a second of the at least two wet brakes comprising a second number of disks which are active for braking, said second of the at least two wet brakes being configured to produce a smaller maximum braking force in relation to the first of the at least two wet brakes, and wherein the first number of disks is greater than the second number of disks;
    all of the disks in each of the first and second wet brakes are configured to interact with at least one adjacent disk in order to produce a braking effect in an associated vehicle wheel; and
    the actuator housings being identical and the disk housings having different exterior and interior shapes in a comparison between the first and second wet brakes so as to accommodate the different number of disks between the first and second disk sets while maintaining substantially the same longitudinal extent as between the first and second wet brakes such that parts adjacent to the brakes can be arranged on respective ones of the plurality of vehicle wheels in substantially the same manner.

2. The set of wet brakes as recited in claim 1, wherein at least one difference between the disk housings is that each disk housing has a side wall which faces a flat side of an outer disk of the respective disk set, and said side walls being arranged at different distances from the respective actuator housings.

3. The set of wet brakes as recited in claim 1, wherein the two housing parts of each of the wet brakes have the same extent in a direction at right angles to the plane of extension of the respective disk set.

4. The set of wet brakes as recited in claim 1, wherein each actuator is a hydraulic piston.

5. The set of wet brakes as recited in claim 4, wherein the hydraulic piston constitutes an actuating means for inducing a braking affect on an associated wheel of the respective wet brake.

6. The set of wet brakes as recited in claim 1, wherein disks active for braking in each of the disk sets are of the same type.

7. The set of wet brakes as recited in claim 1, wherein each wet brake is configured to be singularly associated with a respectively associated vehicle wheel.

8. The set of wet brakes as recited in claim 7, wherein each wet brake is configured to circumscribe at least a portion of an associated vehicle wheel axle.

9. The set of wet brakes as recited in claim 8, wherein at least one difference between the disk housings is that each disk housing has a side wall which faces a flat side of an outer disk of the respective disk set, and said side walls being arranged at different distances from the respective actuator housings.

10. The set of wet brakes as recited in claim 8, wherein the two housing parts of each of the wet brakes have the same extent in a direction at right angles to the plane of extension of the respective disk set.

11. The set of wet brakes as recited in claim 8, wherein each actuator is a hydraulic piston.

12. The set of wet brakes as recited in claim 11, wherein the hydraulic piston constitutes an actuating means for inducing a braking affect on an associated wheel of the respective wet brake.

13. The set of wet brakes as recited in claim 8, wherein disks active for braking in each of the disk sets are of identical configuration.

14. The vehicle as recited in claim 1, wherein each wet brake is configured to be singularly associated with a respectively associated wheel.

15. The vehicle as recited in claim 14, wherein each wet brake is configured to circumscribe at least a portion of an associated wheel axle.

16. The vehicle as recited in claim 14, wherein the different exterior shape of the second housing part in the two brakes includes one side wall of the second housing part, which faces a flat side of an outer disk in the disk set, being arranged at a shorter distance from the first housing part in the first brake than in the second brake.

17. The vehicle as recited in claim 14, wherein the two housing parts of the first brake have the same extent in a direction at right angles to the plane of extension of the disks as the two housing parts of the second brake.

18. The vehicle as recited in claim 14, wherein the actuating means is arranged in the first housing part.

19. The vehicle as recited in claim 14, wherein the actuating means consists of a hydraulic piston.

20. The vehicle as recited in claim 14, wherein the disks active for braking in the disk set of the second brake are of the same type as the disks in the first brake.

21. The vehicle as recited in claim 14, wherein the vehicle is configured as an articulated dumper.

22. A vehicle comprising:
a front axle and at least one rear axle on which wheels of the vehicle are arranged;
a wet brake arranged at each wheel and the brakes being arranged so as to produce different maximum braking force values on the axles;
each of the brakes comprising a housing with two separable housing parts, a disk set enclosed in one of the two housing parts and the other of the two housing parts housing a means for actuating the respective disk set for the purpose of producing a braking effect on the vehicle, and wherein the respective housing parts housing the actuation means are identical between the different brakes;
the disk set of a first of the brakes that is arranged at a wheel on a first of the axles comprising a first number of disks which are active for braking;
the disk set of a second of the brakes that is arranged at a wheel on a second of the axles being configured to produce a smaller maximum braking force in relation to the first brake and comprising, in relation to the first brake, a smaller number of disks that are active for braking than the number of disks active for braking in the first brake; and
all of the disks in each of the disk sets are arranged so as to interact with at least one adjacent disk in order to produce the braking effect and a first of the housing parts is identical in the two brakes and a second of the housing parts have different exterior and interior shapes in a comparison between the first and second brakes so as to accommodate the different number of disks between the disk sets of the first and second brakes while maintaining substantially the same longitudinal extent as between the first and second brakes such that parts adjacent to the brakes can be arranged on respective ones of the plurality of vehicle wheels in substantially the same manner.

23. The vehicle as recited in claim 22, wherein the different exterior shape of the second housing part in the two brakes includes one side wall of the second housing part, which faces a flat side of an outer disk in the disk set, being arranged at a shorter distance from the first housing part in the first brake than in the second brake.

24. The vehicle as recited in claim 22, wherein the two housing parts of the first brake have the same extent in a direction at right angles to the plane of extension of the disks as the two housing parts of the second brake.

25. The vehicle as recited in claim 22, wherein the actuating means is arranged in the first housing part.

26. The vehicle as recited in claim 22, wherein the actuating means consists of a hydraulic piston.

27. The vehicle as recited in claim 22, wherein the disks active for braking in the disk set of the second brake are of the same type as the disks in the first brake.

28. The vehicle as recited in claim 22, wherein the vehicle is configured in the form of an articulated dumper.

29. A set of wet brakes configured to be utilized on a vehicle for braking the vehicle and capable of producing different braking forces at different wheels of the vehicle, said set of wet brakes comprising:
a plurality of brakes, each of which includes a disk set enclosed within a two-part housing;
a first of the plurality of brakes including a first number of disks configured to be capable of producing a first maximum braking force and a second of the plurality of brakes including a second number of disks configured to be capable of producing a second maximum braking force, the first and second maximum braking forces being different from one another; and
the two-part housing of the first brake having one part substantially identical to one part of the two-part housing of the second brake and the two-part housing of the first brake having a second part having a different exterior and interior shape compared to a second part of the two-part housing of the second brake so as to accommodate the different number of disks between the first and second brakes while maintaining substantially the same longitudinal extent as between the first and second brakes such that parts adjacent to the brakes can be arranged on respective ones of the vehicle wheels in substantially the same manner.

30. The set of wet brakes as recited in claim 29, further comprising:
each of the plurality of brakes having substantially identical longitudinal lengths.

31. The set of wet brakes as recited in claim 29, further comprising:
the second part of the two-part housing of the first brake having a substantially identical longitudinal length compared to the second part of the two-part housing of the second brake.

32. The set of wet brakes as recited in claim 31, further comprising:
the second part of the two-part housing of the first brake sized differently from the second part of the two-part housing of the second brake thereby establishing an interior volume in the first brake different from an interior volume in the second brake.

33. The set of wet brakes as recited in claim 32, further comprising:
the second part of the two-part housing of the first brake having an extension portion sized differently from an extension portion of the second part of the two-part housing of the second brake thereby establishing the substantially identical longitudinal lengths of the first and second brakes.

34. The set of wet brakes as recited in claim 32, further comprising:
each of the first parts of the first and second brakes having a longitudinally reciprocating piston that actuates braking action in respectively associated disks; and
the extension portion of the second part of the two-part housing of the first brake being positioned substantially opposite to the longitudinally reciprocating piston of the first brake and the extension portion of the second part of the two-part housing of the second brake being positioned substantially opposite to the longitudinally reciprocating piston of the second brake.

35. A set of wet brakes for a multi-wheeled vehicle in which different braking force values are provided to each of at least two of a plurality of vehicle wheels, the set of wet brakes comprising:
two braking assemblies, each of said two braking assemblies singularly arrangeable at one of two wheels of a multi-wheeled vehicle wherein each of the two wheels is to be provided different braking force values and each of said two braking assemblies being configured to circumscribe an associated vehicle wheel axle when installed upon the multi-wheeled vehicle;
each of said two braking assemblies comprising an actuator housing encompassing a disk actuator and a brake disk housing encompassing a plurality of brake disks, said actuator housing of each of said two braking assemblies being substantially identical and said brake disk housing of each of said two braking assemblies being substantially different in exterior and interior shape while maintaining substantially the same longitudinal extent; and a disk set of a first of the two brakes comprising a first number of disks which are active for braking, and a disk set of a second of the two brakes, which brake is intended for a smaller maximum braking force in relation to the first of the two brakes, comprising, in relation to the first number, a smaller number of disks compared to the disks in the first brake.

* * * * *